US008559920B2

(12) United States Patent
Evenou et al.

(10) Patent No.: US 8,559,920 B2
(45) Date of Patent: Oct. 15, 2013

(54) METHOD OF CHECKING ACCESS RIGHTS IN A MOBILE RADIO SYSTEM

(75) Inventors: Jean Alain Evenou, Meudon (FR); Michel Jacob, Chaville (FR)

(73) Assignee: Alcatel Lucent, Paris (FR)

( * ) Notice: Subject to any disclaimer, the term of this patent is extended or adjusted under 35 U.S.C. 154(b) by 1781 days.

(21) Appl. No.: 11/063,525

(22) Filed: Feb. 24, 2005

(65) Prior Publication Data

US 2005/0197100 A1   Sep. 8, 2005

(30) Foreign Application Priority Data

Feb. 27, 2004   (FR) ...................................... 04 50372

(51) Int. Cl.
   *H04M 3/16*   (2006.01)
(52) U.S. Cl.
   USPC ......................................................... 455/410
(58) Field of Classification Search
   USPC ................ 455/410, 456.1, 414.1, 411, 552.1; 370/401, 466
   See application file for complete search history.

(56) References Cited

U.S. PATENT DOCUMENTS

| 2005/0002407 | A1* | 1/2005 | Shaheen et al. | 370/401 |
| 2005/0014485 | A1* | 1/2005 | Kokkonen et al. | 455/411 |
| 2005/0272465 | A1* | 12/2005 | Ahmavaara et al. | 455/552.1 |
| 2006/0135174 | A1* | 6/2006 | Kraufvelin et al. | 455/456.1 |
| 2006/0291455 | A1* | 12/2006 | Katz et al. | 370/355 |

FOREIGN PATENT DOCUMENTS

| WO | WO 98/59513 A1 | 12/1998 |
| WO | WO 02/25981 A1 | 3/2002 |

OTHER PUBLICATIONS

S. Peutz et al, Secure Interoperation Between 2G and 3G Mobile Radio Networks' International Conference on 3G Mobile Communication Technologies, Mar. 27, 2000, pp. 28-32, XP001016360.

* cited by examiner

*Primary Examiner* — Melody Mehrpour
(74) *Attorney, Agent, or Firm* — Sughrue Mion, PLLC

(57) ABSTRACT

One aspect of the present invention is a method of checking access rights in a mobile radio system, comprising steps whereby:
   a core network serving entity receives from a mobile user database different types of authentication data according to the type of services authorized for said users, and
   said serving entity uses said authentication data to check the access rights of said users according to the type of services authorized.

14 Claims, 5 Drawing Sheets

FIG_1

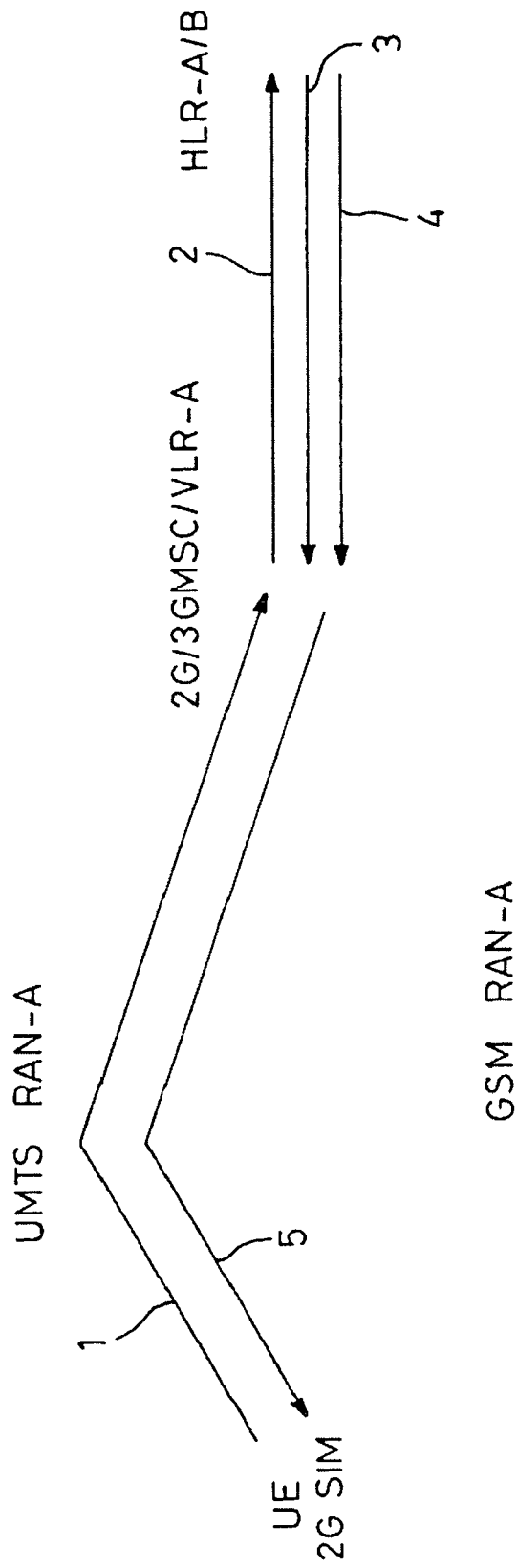
FIG_3

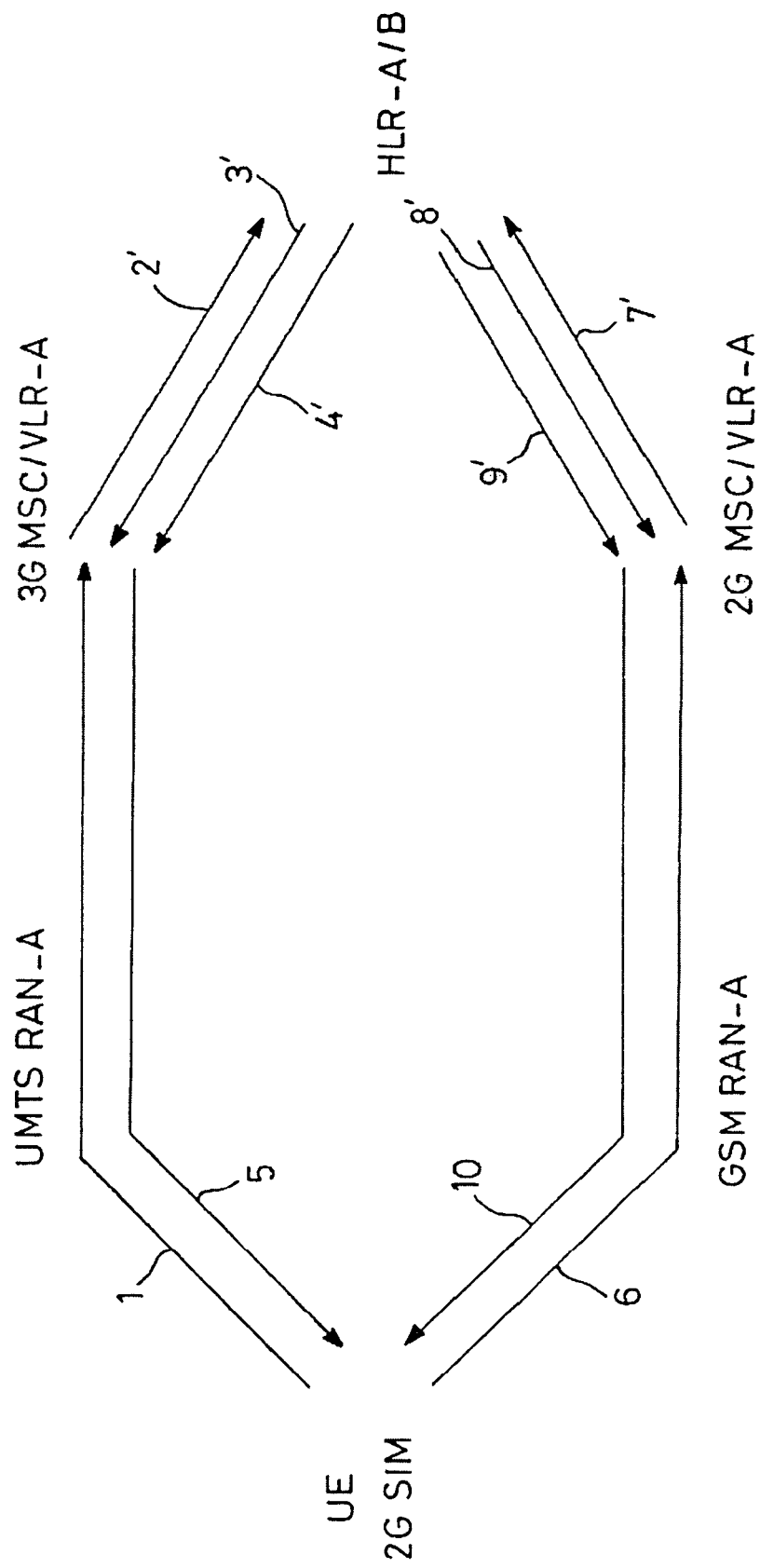
FIG_4

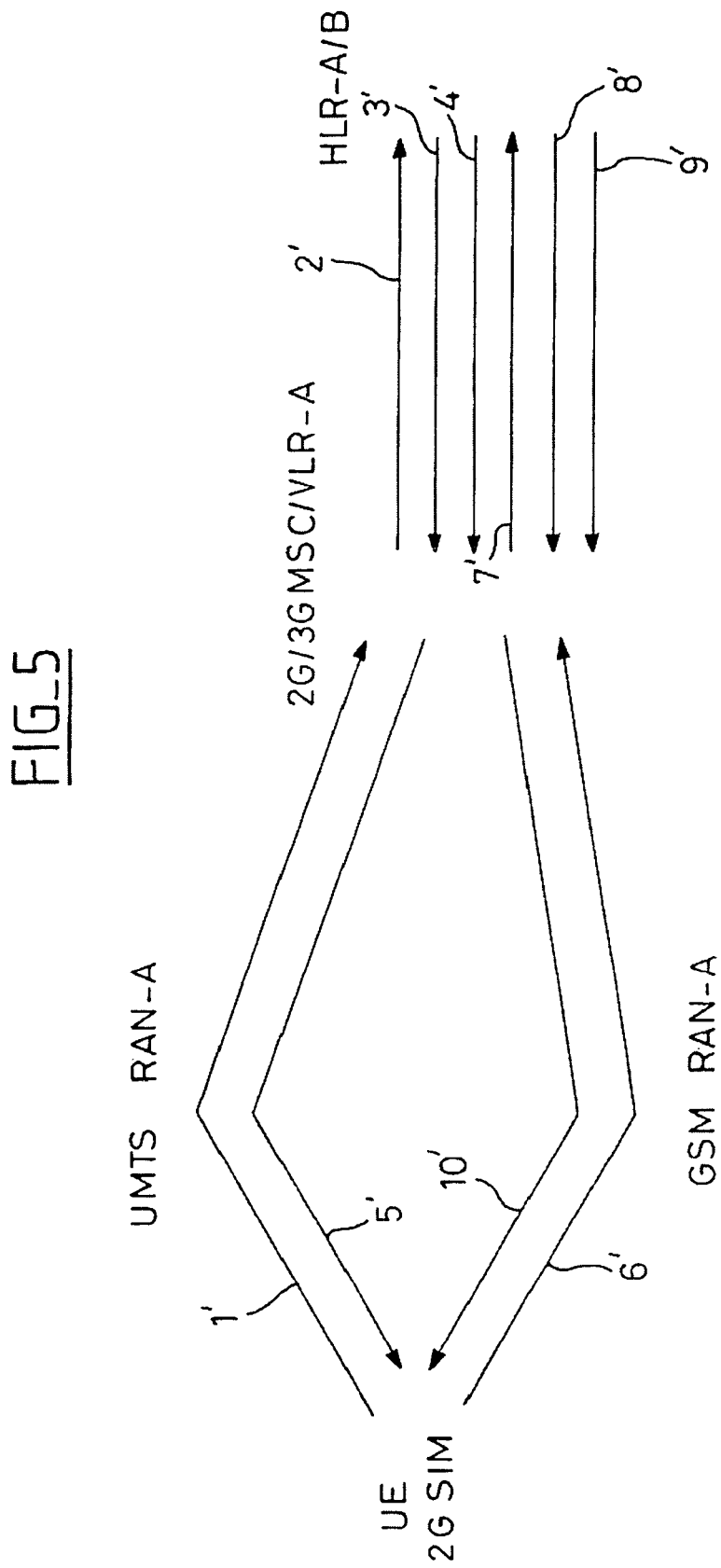

METHOD OF CHECKING ACCESS RIGHTS IN A MOBILE RADIO SYSTEM

The present invention relates generally to mobile radio systems.

Mobile radio systems are generally covered by standards and the corresponding standards published by the corresponding standards organizations may be consulted for more information.

The general architecture of this kind of system is described briefly with reference to FIG. 1. This kind of system comprises a mobile radio network 1 communicating with mobile terminals 2 and with external networks (not specifically shown). The network 1 includes a radio access network (RAN) 3 that is primarily responsible for transmission and for managing radio resources at the radio interface between the network and the mobile terminals, and a core network (CN) 4 that is primarily responsible for routing and for managing calls.

Changing requirements and advances in technology generally lead to distinguishing between different types of systems, in particular between second generation systems and third generation systems.

The Global System for Mobile communication (GSM) is a typical example of a second generation system. Originally, the GSM was essentially intended to provide circuit type services. Packet type services were introduced afterwards, through the General Packet Radio Service (GPRS) function.

In a system such as the GSM, for example, a mobile terminal is called a mobile station (MS), the radio access network (RAN) comprises base station subsystems (BSS), and the core network (CN) includes, in the circuit-switching domain (CS domain), second generation mobile switching centre (2G-MSC) network elements and, in the packet-switching domain (PS domain), second generation serving GPRS support node (2G-SGSN) network elements.

The Universal Mobile Telecommunication System (UMTS) is a typical example of a third generation system.

In a system such as the UMTS, for example, a mobile terminal is called a user equipment (UE), the radio access network (RAN) is called the UMTS terrestrial radio access network (UTRAN), and the core network (CN) includes, in the CS domain, third generation mobile switching centre (3G-MSC) network elements and, in the CS domain, third generation serving GPRS support node (3G-SGSN) network elements.

In second generation systems (for example the GSM) and in third generation systems (for example the UMTS), the core network further comprises mobile user databases or registers containing subscription data and user location data and including a home location register (HLR) and a visitor location register (VLR). In the CS domain, the VLR is generally associated with the MSC, whence the use of the term MSC/VLR. In the PS domain, the VLR is generally integrated into the SGSN.

In second generation systems (for example the GSM) a mobile terminal is associated with a subscriber identification module known as a SIM card and in third generation systems (for example the UMTS) a mobile terminal is associated with a subscriber identification module known as a USIM card.

The above systems generally have a cellular architecture and include mechanisms for continuously selecting the best serving cell.

To extend the geographical coverage of the above systems and/or the services they offer, a plurality of public land mobile network (PLMNs) is generally provided, generally associated with different carriers or "operators". Mechanisms are also provided for continuously choosing a best serving network if the carriers concerned have entered into roaming agreements. The "home PLMN" (HPLMN) is the network with which a user has a subscription and a "visited PLMN" (VPLMN) is a network other than the HPLMN within whose coverage a user is located.

For managing the mobility of users and checking access rights, the cells of a given network are generally grouped into geographical areas generally called location areas (LA) in the CS domain or routing areas (RA) in the PS domain.

The CS domain and mechanisms for selecting or reselecting cells implemented in an idle mode are considered hereinafter by way of example.

A mobile terminal is able to tell if a new cell selected by the mobile terminal belongs to the same location area as its current serving cell from information broadcast in each cell. If it does, the new cell becomes the new serving cell. If it does not, the terminal advises the network of this beforehand, using a location updating procedure, in order to have the right of the user to access the new cell checked.

In the context of this location updating procedure, the mobile terminal sends the network a "Location Area Updating Request" message.

In the event of a positive response from the network, the network sends back to the mobile terminal a "Location Area Updating Accept" message. The user is then registered in the new location area and the selected cell becomes the new serving cell.

In the event of a negative response from the network, the network sends back to the mobile terminal a "Location Area Updating Reject" message and indicates the reason for rejecting the request, known as the "cause" of its rejection.

A registration procedure is provided for selecting an initial serving cell when the terminal is switched on.

The access rights may therefore be checked in particular during a registration procedure or during a location updating procedure. Procedures or protocols are provided for this purpose, involving in particular:

exchanges of signaling between the terminal and a core network serving entity (such as in particular a MSC/VLR entity in the CS domain), and exchanges of signaling between said core network serving entity and a mobile user database such as the home location register (HLR).

Moreover, at least in their roll-out phase, third generation networks will be added onto existing second generation infrastructures. In other words, the same system may then comprise a second generation radio access network and a third generation radio access network, with the third generation radio coverage area overlapping the second generation radio coverage area. For common services supported by both generations, such as telephone services in particular, this ensures continuity of service by exploiting the existing coverage provided by a second generation network.

However, new problems may arise in this situation, as illustrated by the following example.

In the context of the SIM roaming function, it is possible for a user who subscribes only to second generation services (for example GSM services) to insert the SIM card into a third generation terminal (for example a UMTS terminal) and to attempt to access a PLMN (either the corresponding HPLMN or a VPLMN with which the corresponding HPLMN has a roaming agreement) via the radio access network of that PLMN (the UTRAN in this example). Now, the carrier may wish to reserve access to that PLMN via the UTRAN to users who have a UMTS subscription. This requires a solution to the problem of preventing a user subscribing only to the GSM from registering on a PLMN via the UTRAN, whilst at the same time allowing that user to register in that PLMN via the GSM radio access network. Note that this problem arises more particularly in the situation where the same PLMN code is used both for the GSM and for the UMTS.

FIG. 2 shows by way of example the location updating procedure in the situation where a third generation mobile terminal (UE) associated with a second generation SIM (2G-SIM) card attempts to access an HPLMN via a third generation radio access network (UMTS RAN). This PLMN may be either an HPLMN or a VPLMN. Both these possibilities are indicated by the letters A and B in FIG. 2, the elements of the PLMN concerned being denoted UMTS RAN-A and 3G MSC/VLR-A, and the HLR being denoted HLR A-B.

FIG. 2 corresponds, by way of example, to the PLMN configuration situation in which MSC/VLR dedicated to the UMTS (3G MSC/VLR) are provided in addition to MSC/VLR dedicated to the GSM (2G MSC/VLR).

FIG. 3 is similar to FIG. 2 (the same references are used in both figures) and differs from it only in that it corresponds to the PLMN configuration situation in which the same MSC/VLR (2G/3G MSC/VLR) supports the GSM and the UMTS in common.

The location updating procedure shown by way of example in FIG. 2 includes the following steps.

In a step 1, the terminal UE sends a location updating request to a 3G MSC/VLR via the UMTS RAN. The situation is considered by way of example in which location updating implies a change of serving MSC/VLR so that the new MSC/VLR must interrogate the HLR beforehand to check access rights.

On receiving this location updating request, the 3G MSC/VLR does not know if the user is a GSM or UMTS subscriber and therefore sends corresponding requests to the HLR in a step 2.

In a step 3, a procedure that is not described in detail enables the new MSC to obtain from the HLR subscription data to be stored in the associated VLR.

As indicated hereinabove, a solution is then required to the problem of preventing a user subscribing only to the GSM from registering in a PLMN via the UTRAN. In other words, a solution must be found to the problem of providing means enabling the 3G MSC/VLR to detect if the user concerned is a GSM subscriber or a UMTS subscriber. If the 3G MSC/VLR is unable to detect if the user concerned is a GSM subscriber or a UMTS subscriber, in a step 5 it sends the UE a location updating accept message (on the assumption that the user's subscription does not comprise other restrictions, for example geographical restrictions, prohibiting access to the new location area).

In the current version of the Third Generation Partnership Project (3GPP) standard, the subscription data transferred by the HLR to the 3G MSC/VLR contains no information enabling the 3G MSC/VLR to detect if the user is a GSM subscriber or a UMTS subscriber.

To enable the 3G MSC/VLR to detect if the user is a GSM subscriber or a UMTS subscriber, as described in Patent Application WO 02/190784, for example, the HLR may send the 3G MSC/VLR subscription data including a list of authorized services (such as GSM, UMTS services in particular) for the user concerned.

However, a solution of this kind is less than perfect, in particular because it increases the amount of signaling exchanged between the HLR and the 3G MSC/VLR; as the Applicant has also realized, it does not make optimum use of existing procedures.

One object of the present invention is to avoid such drawbacks. A more general object of the present invention is to optimize access rights checking procedures, in particular in systems in which different types of services may be offered, such as in particular second generation services (such as in particular GSM services) and third generation services (such as in particular UMTS services).

One aspect of the present invention consists in a method of checking access rights in a mobile radio system, comprising steps whereby:

a core network serving entity receives from a mobile user database different types of authentication data according to the type of services authorized for said users, and said serving entity uses said authentication data to check the access rights of said users according to the type of services authorized.

Another aspect of the present invention consists in a core network server entity for mobile radio systems comprising means for implementing the above method.

Other aspects and features of the present invention will become apparent on reading the following description of one embodiment of the invention, which is given with reference to the appended drawings, in which:

FIGS. 2 and 3 illustrate a problem solved by the present invention, and

FIGS. 4 and 5 illustrate one example of a solution in accordance with the present invention.

In the example shown in FIGS. 2 and 3, the present invention suggests in particular, to solve the problem as stated hereinabove, that a core network serving entity (for example a MSC/VLR serving entity in the case of the CS domain) use authentication data, also known as authentication vectors, to detect if the user is a GSM subscriber or a UMTS subscriber, enabling the execution of an authentication procedure.

Figure 1:
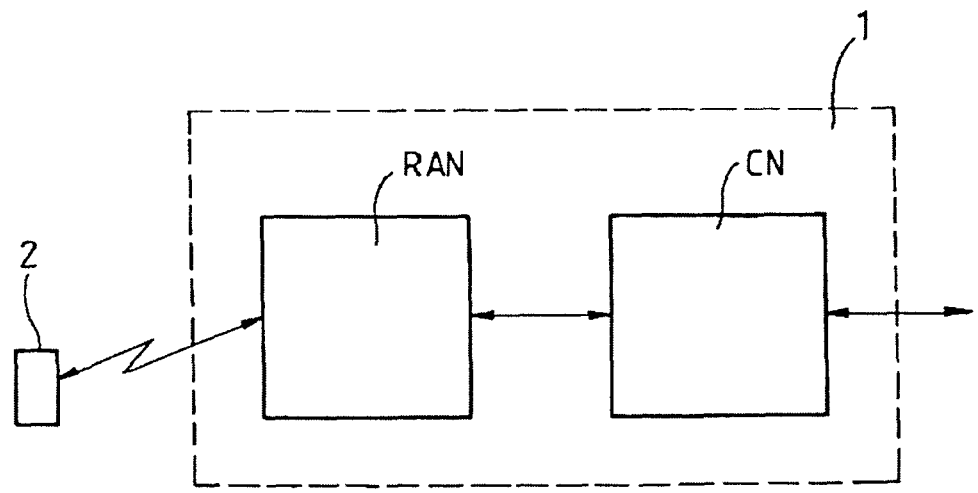
FIG. 1 shows the general architecture of a mobile radio system.
Figure 2:
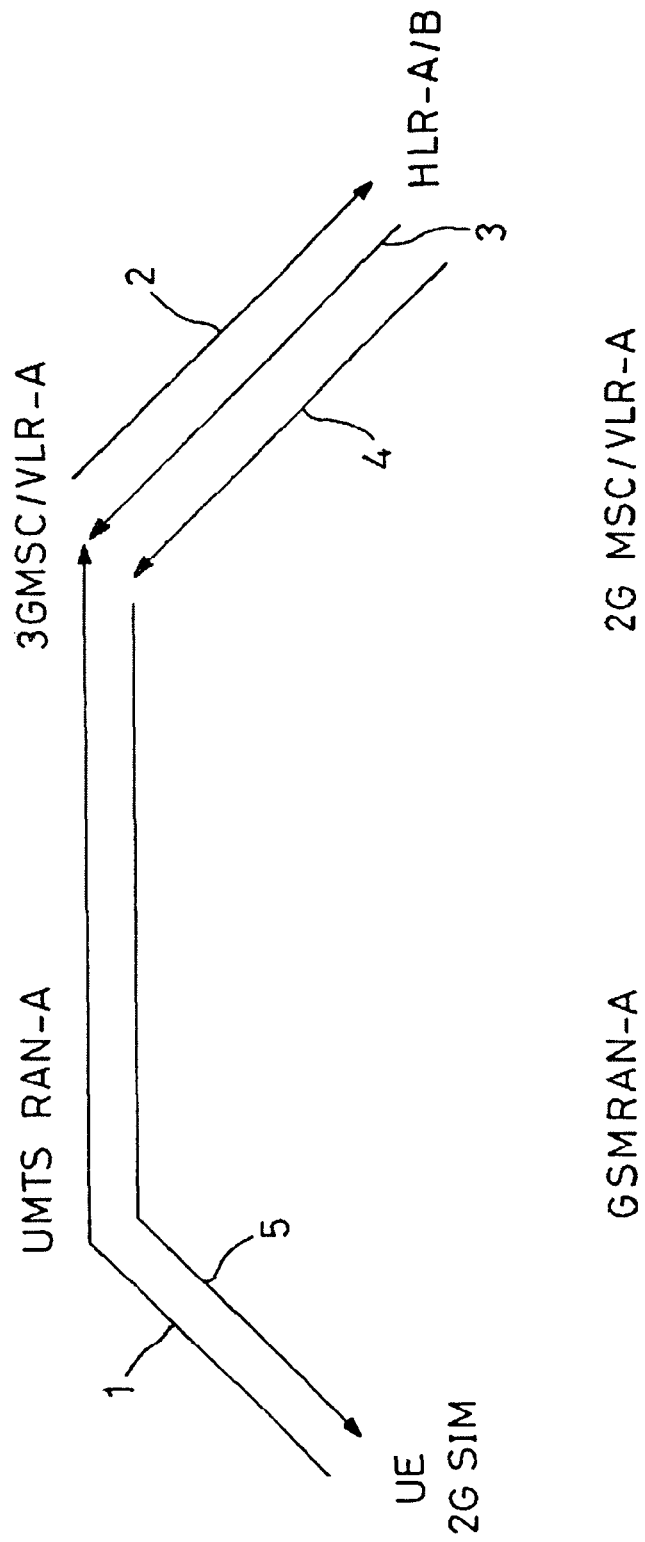

For example, in the situation of a location updating procedure as referred to in the example illustrated by FIGS. 2 and 3, said authentication data (or vectors) is (or are) received from the HLR in a procedure (not explained in detail) executed during a step 4.

The present invention suggests exploiting the fact that the authentication data (or vectors) is (or are) of different types according to the type of services authorized, in this instance according to the authorized services corresponding to second generation (for example GSM) services or to third generation (for example UMTS) services, as explained below. The authentication data is requested by the MSC/VLR and supplied by the HLR before other subscription data.

It will be remembered that the authentication procedure enables the network to verify reliably the identity of a user.

The principal steps of this authentication procedure are described hereinafter, firstly for a second generation system (for example the GSM).

The authentication procedure includes calculating a Signed RESult (SRES) parameter using a calculation algorithm whose input parameters comprise a secret key K associated with the user and a random value of a RANDom number (RAND) parameter.

This kind of calculation is effected firstly in the network (in an authentication centre (AuC)) associated with the HLR and secondly in the terminal (on the SIM card), using the same calculation algorithm and the same input parameters of that algorithm (the secret key K is known both to the network and to the terminal, and the value of the parameter RAND is communicated to the terminal by the network).

The result of the calculation effected in the terminal is communicated to the network, which checks if it matches the calculation that it has effected for itself. If so, the authentication procedure terminates with a positive result.

In a third generation system (for example the UMTS), the authentication procedure differs from the above procedure for a second generation system (for example the GSM) mainly in the following respects:

In addition to calculating the parameter SRES in the manner described above, a message authentication code (MAC) parameter is also calculated, using a calculation algorithm with input parameters comprising the parameters RAND and K defined above and components of an AUthentication TokeN (AUTN) parameter. The parameter MAC is calculated in the network and in the terminal, using the same calculation algorithm and the same input parameters of that algorithm, the parameter AUTN being communicated to the terminal by the network.

In addition to the fact that the network checks if the parameter SRES that it has calculated matches the parameter SRES that it has received from the terminal, to enable it to verify reliably the identity of the terminal, the terminal also checks if the parameter MAC that it has calculated matches the parameter MAC that it has received from the serving network, to enable it to verify reliably the identity of the serving network.

The verifications effected in the network to implement the authentication procedure are generally effected in a core network serving entity, for example the MSC/VLR in the CS domain, on the basis of authentication data communicated to it by the HLR/AuC. This authentication data (or vectors) is (or are) generally communicated by the HLR/AuC to the MSC/VLR during a location updating procedure involving a change of serving MSC/VLR. It is (or they are) generally communicated in a sufficient quantity (or in sufficient numbers) to avoid this kind of transfer of authentication data (or vectors) each time that the MSC/VLR needs to execute the authentication procedure.

In the case of authorized second generation (for example GSM) services, an authentication vector (also known as a "triplet") has three components, namely RAND, SRES and CK, the parameters RAND and SRES being those defined above and the parameter CK corresponding to a ciphering key.

In the case of authorized third generation (for example UMTS) services, an authentication vector (also known as a "quintet") has five components, namely RAND, AUTN, SRES, CK and IK, the parameters RAND, AUTN, SRES, CK being those defined above and the parameter IK corresponding to an integrity key.

Thus the present invention suggests exploiting the fact that the authentication data (or vectors) is (or are) of different types according to the type of services authorized, namely second generation (for example GSM) services or third generation (for example UMTS) services.

FIGS. 4 and 5, respectively corresponding to the examples illustrated by FIGS. 2 and 3, illustrate one example of a solution in accordance with the present invention.

The steps 1', 2', 3', 4' shown in FIGS. 4 and 5 may be similar to the steps 1, 2, 3, 4 shown in FIGS. 2 and 3.

In the examples illustrated by FIGS. 4 and 5, the 3G MSC/VLR detects if the user is a GSM subscriber or a UMTS subscriber on the basis of the authentication data (or vectors) received from the HLR.

If the authentication vectors correspond to triplets, the user is considered to be a GSM subscriber and the 3G MSC/VLR then sends the UE a location updating reject message in a step 5'.

If the terminal is a dual-mode terminal (UE/MS), the cause of the location updating rejection via the UMTS RAN is that location updating may then be attempted via the GSM RAN, as illustrated by the following steps:

In a step 6', the terminal UE/MS sends a location updating request to a 2G MSC/VLR via the GSM access network.

In a step 7', on receiving this location updating request, the 2G MSC/VLR sends a corresponding request to the HLR.

In a step 8', the new MSC obtains from the HLR subscription data to be stored in the associated VLR.

In a step 9', the new MSC obtains from the HLR authentication data enabling it to execute an authentication procedure.

In a step 10', the 2G MSC/VLR sends the UE/MS a location updating accept message (on the assumption that the user's subscription does not include other restrictions, for example geographical restrictions, prohibiting access to the new location area).

Thus one aspect of the present invention is a method of checking access rights in a mobile radio system comprising steps whereby:

a core network serving entity receives from a mobile user database different types of authentication data according to the type of services authorized for said users, and said serving entity uses said authentication data to check the access rights of said users according to the type of services authorized.

Another aspect of the present invention is a core network serving entity (for example an MSC/VLR serving entity in the CS domain or an SGSN serving entity in the PS domain) comprising means for implementing this kind of method.

Thus another aspect of the present invention is a core network serving entity comprising:

means for receiving from a mobile user database different types of authentication data according to the type of services authorized for said users, and means for using said authentication data to check the access rights of said users according to the type of services authorized.

This kind of serving entity may further comprise means for sending a negative response after checking said access rights during the execution of a procedure for accessing unauthorized services, said negative response triggering the execution of a procedure for accessing authorized services.

The above means may operate in accordance with the method described above; their particular implementation representing no particular problem for the person skilled in the art, such means do not need to be described in more detail here than by stating their function.

What is claimed is:

1. A method of checking access rights in a mobile radio system, the method comprising:

a core network serving entity receiving from a mobile user database different types of authentication data according to different types of services authorized for said users, and said core network serving entity using said authentication data to check access rights of said users according to the types of services authorized.

2. A method according to claim 1, wherein said different types of services comprise second generation services and third generation services.

3. A method according to claim 1, wherein, in the case of second generation services, said authentication data corresponds to vectors having three components.

4. A method according to claim 1, wherein, in the case of third generation services, said authentication data corresponds to vectors having five components.

5. The method according to claim 1, the method further comprising:
   after checking said access rights during a first access procedure for accessing unauthorized services, said core network serving entity sending a negative response, and
   said negative response triggering a second access procedure for accessing authorized services.

6. The method according to claim 5, wherein said first and second access procedures comprise a location updating procedure and said negative response comprises a location updating rejection comprising an appropriate cause of rejection.

7. The method according to claim 1, wherein said core network serving entity receives said authentication data during a location updating procedure.

8. A core network serving entity for a mobile radio system, said core network serving entity comprising:
   a receiving unit which receives from a mobile user database different types of authentication data according to different types of services authorized for said users, and
   a checking unit which uses said authentication data to check access rights of said users according to the different types of services authorized.

9. The core network serving entity according to claim 8, the core network serving entity further comprising a sending unit which sends a negative response after checking said access rights during execution of a first access procedure for accessing unauthorized services, wherein said negative response triggers execution of a second access procedure for accessing authorized services.

10. The core network serving entity according to claim 8, wherein said core network serving entity corresponds to a mobile switching center/visitor location register entity in a circuit-switched domain.

11. The core network serving entity according to claim 8, wherein said core network serving entity corresponds to a serving General Packet Radio Services entity in a packet-switched domain.

12. The core network serving entity according to claim 8, wherein said different types of services comprise second generation services and third generation services.

13. The core network serving entity according to claim 8, wherein, in a case of second generation services, said authentication data corresponds to vectors having three components.

14. The core network serving entity according to claim 8, wherein, in a case of third generation services, said authentication data corresponds to vectors having five components.

* * * * *